United States Patent [19]

Hong

[11] Patent Number: 5,159,440
[45] Date of Patent: Oct. 27, 1992

[54] TIME DIFFERENCE CORRECTION CIRCUIT FOR BRIGHTNESS AND CHROMINANCE SIGNALS

[75] Inventor: Sung H. Hong, Seoul, Rep. of Korea
[73] Assignee: Gold Star Co., Ltd., Seoul, Rep. of Korea
[21] Appl. No.: 653,662
[22] Filed: Feb. 8, 1991
[30] Foreign Application Priority Data
Feb. 15, 1990 [KR] Rep. of Korea ............ 1646/1990
[51] Int. Cl.⁵ .................... H04N 9/44; H04N 9/89
[52] U.S. Cl. .................................. 358/17; 358/320
[58] Field of Search .............. 358/17, 19, 39, 40, 358/320, 326

[56] References Cited

U.S. PATENT DOCUMENTS

| 3,629,491 | 12/1971 | Dann et al. | 358/19 |
| 3,820,154 | 6/1979 | Faroudja et al. | 358/19 |
| 4,193,085 | 3/1980 | Imamura | 358/320 |
| 4,485,395 | 11/1984 | Warren | 358/17 |
| 4,864,387 | 9/1989 | Tatami | 358/19 |

FOREIGN PATENT DOCUMENTS

| 55-079593 | 6/1980 | Japan | 358/19 |
| 60-146592 | 2/1985 | Japan | 358/17 |

Primary Examiner—James J. Groody
Assistant Examiner—Safet Metjahic
Attorney, Agent, or Firm—Fish & Richardson

[57] ABSTRACT

A time difference correction circuit for brightness and chrominance signals divides a signal from a tape detected by a tape head into a brightness signal and a chrominance signal, demodulates and filters the signals, and then adds them to produce a composite video signal. The circuit includes a delay element for delaying the chrominance signal by a predetermined horizontal interval, and a vertical synchronizing signal generation circuit for detecting a vertical synchronizing signal in the brightness signal and delaying it to a start point of a video signal. The circuit further includes a switch for switching the brightness and chrominance signals at the start point, a comparison circuit for comparing the brightness and chrominance signals, a difference signal generation circuit which generates an output signal indicative of the difference between the brightness and chrominance signals, a time difference signal detection circuit for detecting a time difference between the brightness and chrominance signals and for outputting a polarity signal corresponding to the time difference, and an inverter for inverting the polarity of the difference signals using the time difference signal as a control signal. The circuit further includes a reset circuit for differentiating the output of the vertical synchronizing signal generation circuit and outputting only the positive component of the differentiated signal as a control signal. A voltage controlled oscillator is provided having a frequency variable with the level and polarity of the output signal of the invertor and which outputs an oscillation frequency to the delay line element.

6 Claims, 7 Drawing Sheets

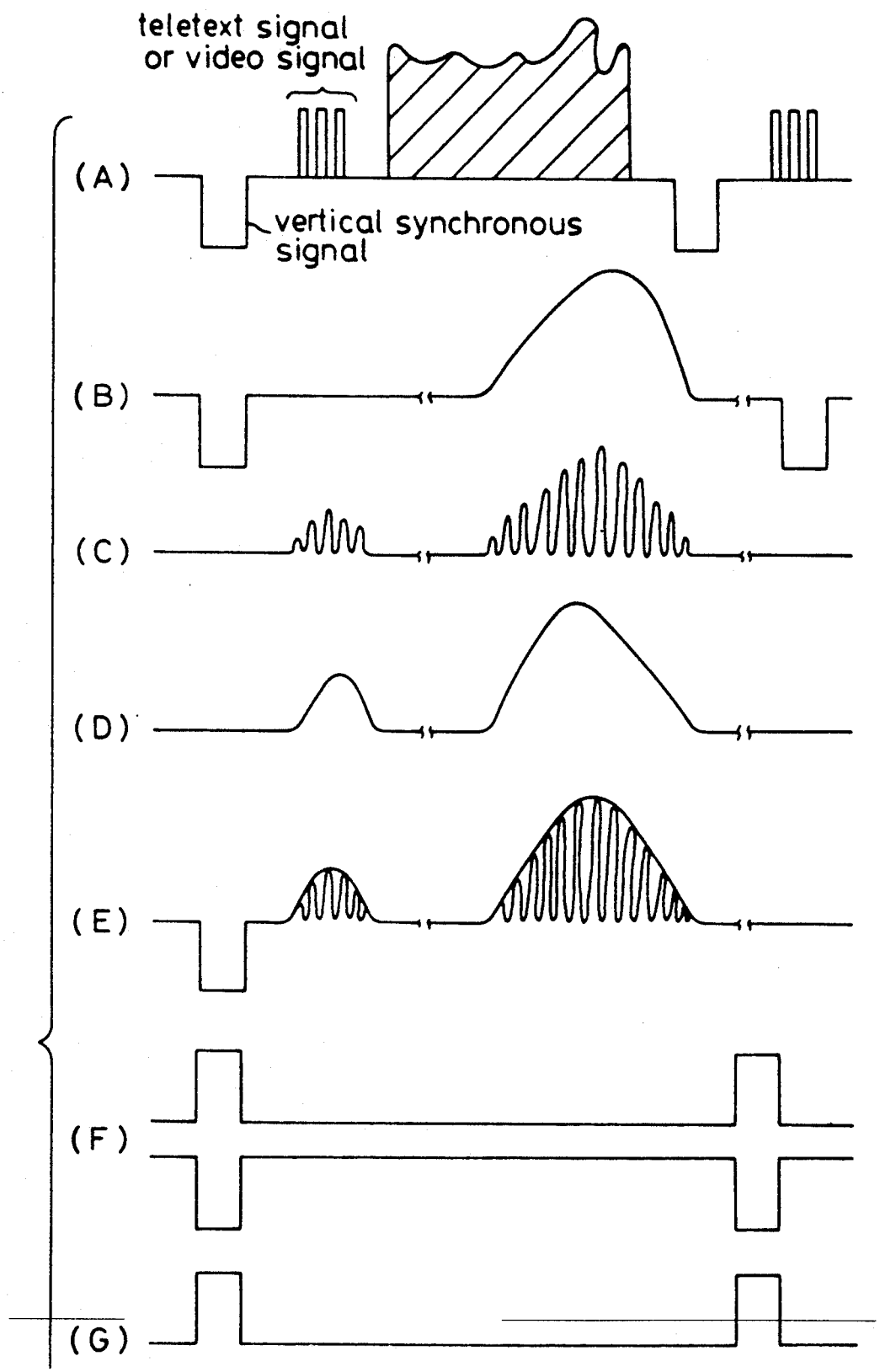

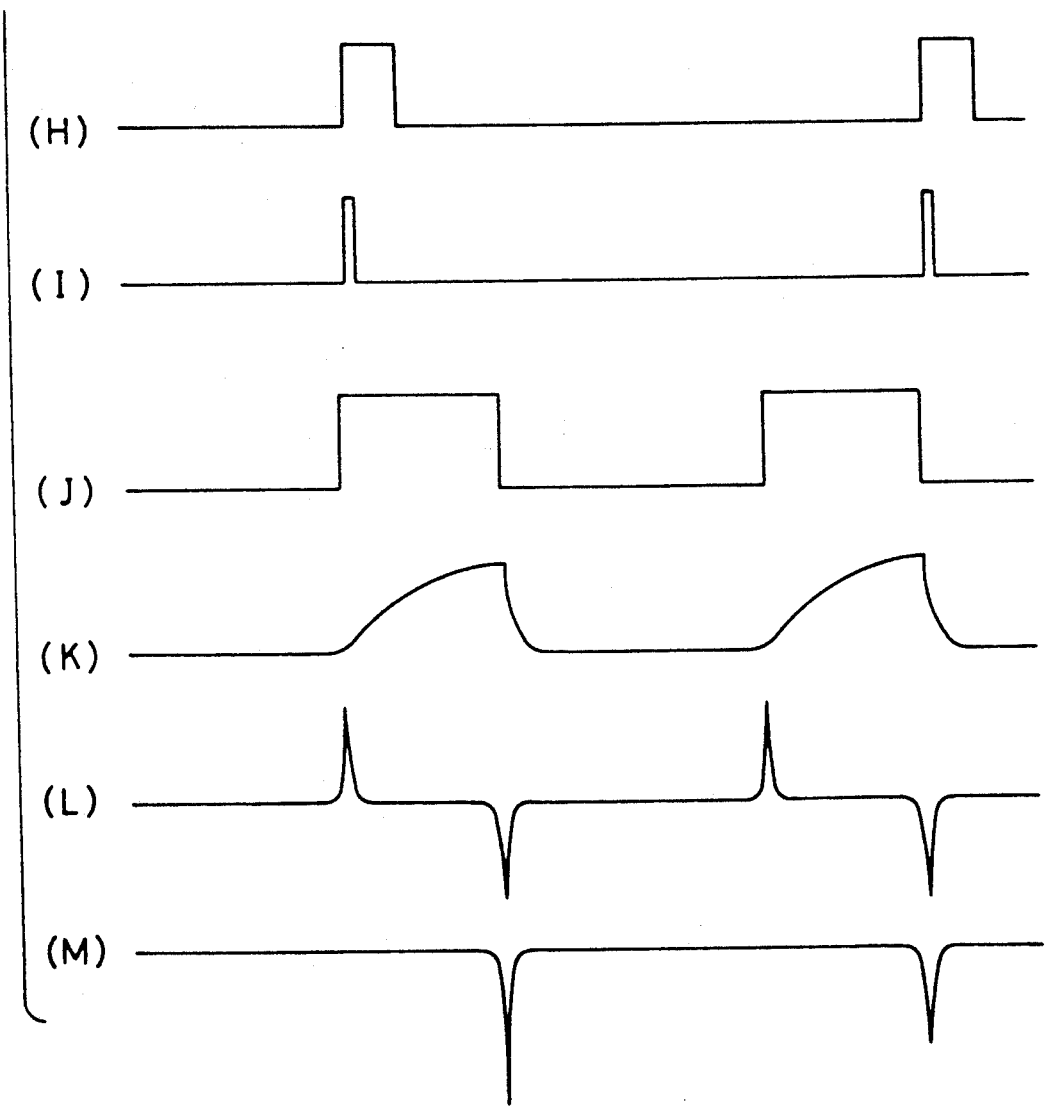

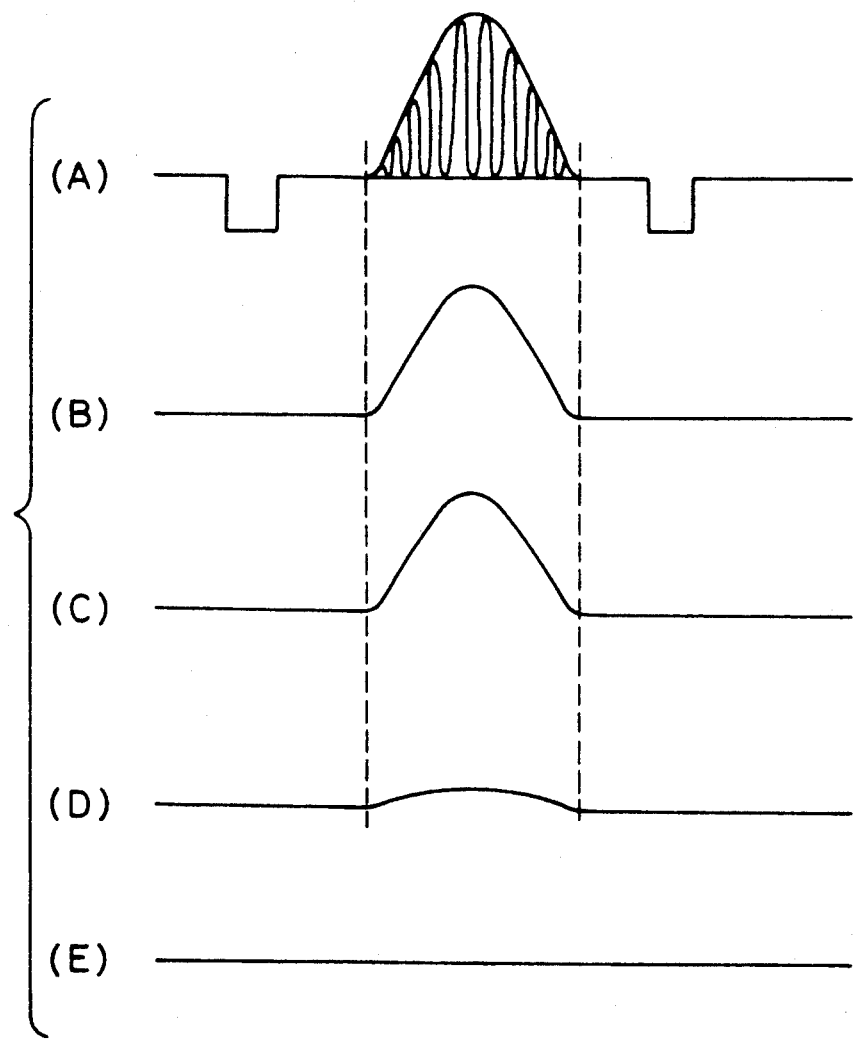

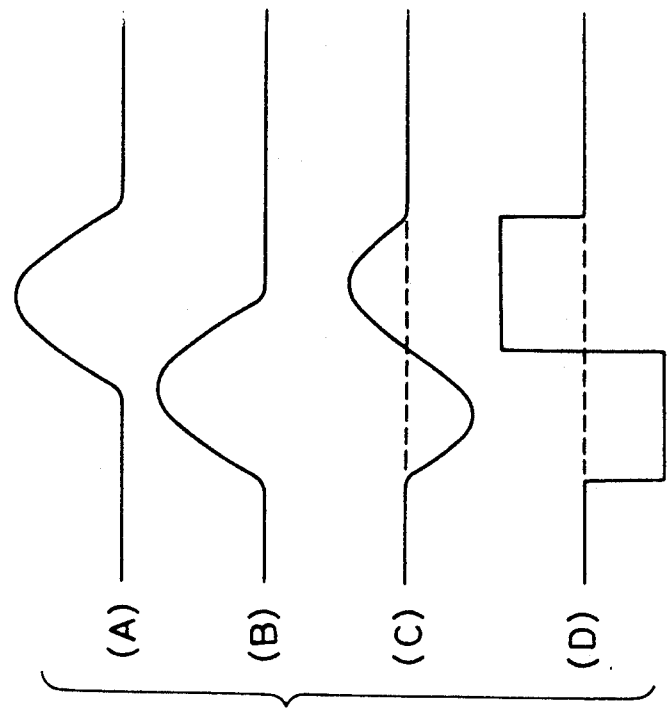
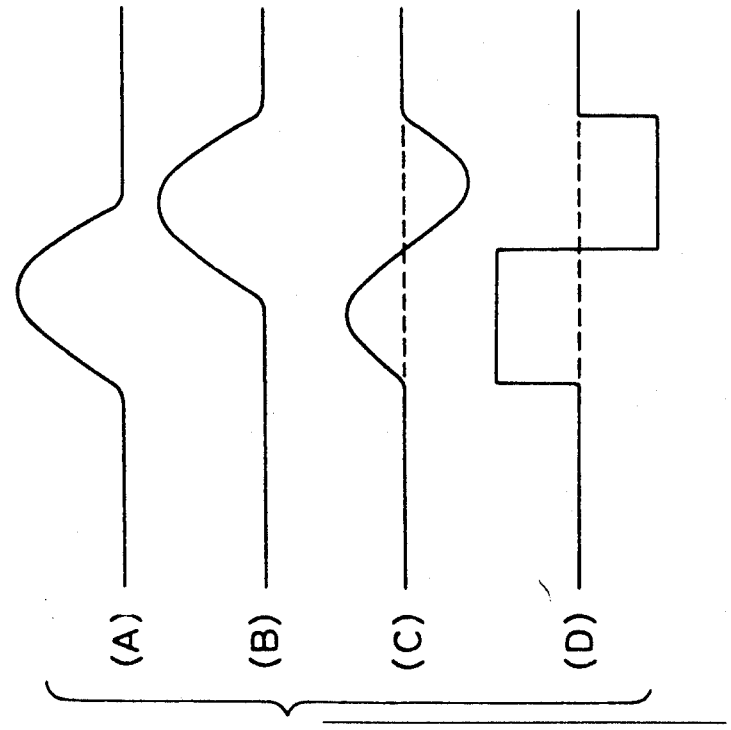

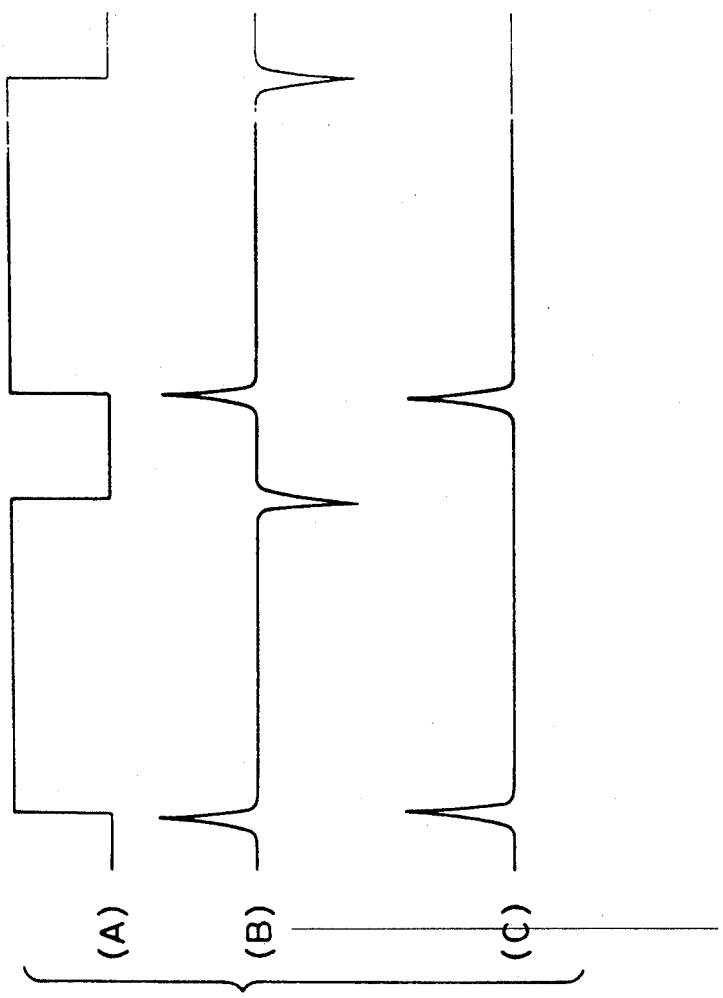
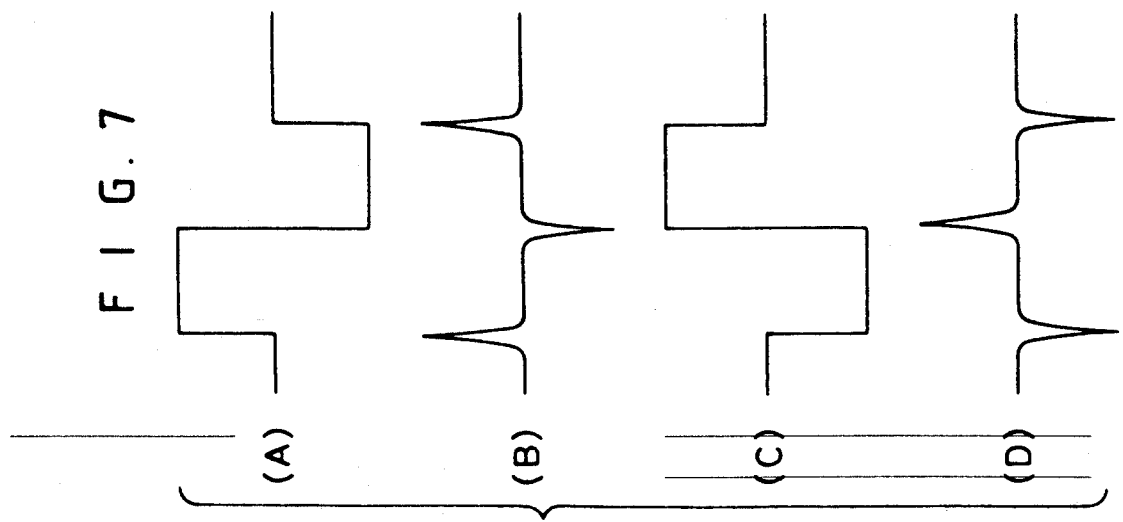

5,159,440

TIME DIFFERENCE CORRECTION CIRCUIT FOR BRIGHTNESS AND CHROMINANCE SIGNALS

BACKGROUND OF THE INVENTION

The present invention relates to a time difference correction circuit for brightness and chrominance signals.

As shown in FIG. 1, in playback operation of a prior VCR(Video Cassette Recorder) system, a teletext signal or a video signal recorded on a tape(1) is detected by a head(2) and the detected signal passes via preamplifier(3) to the frequency demodulator(4) and the low pass filter for 3MHz(5) in sequence to detect a brightness signal.

On the other hand, the signal of the tape(1) detected through the head(2) passes through a second low-pass filter(9), a main converter(10) and the band pass filter(11) in sequence to detect a chrominance signal.

The detected brightness and chrominance signals are added through the adder(6) to produce a composite video signal(7).

However, the prior VCR system has a disadvantage that when the date recorded in tape(1) is played back time difference between brightness and chrominance signals is generated by characteristics of its products so that it is likely that a brightness signal deviates from a chrominance signal and therefore a picture image is not clear at the high frequency characteristics of a brightness signal.

SUMMARY OF THE INVENTION

Accordingly, it is an object of the present invention to provide a time difference correction circuit for brightness and chrominance signals which obtains a picture image in which brightness and chrominance signals are accorded each other by correcting time difference between them regardless of tapes or signal processing of VCR to give a distict picture.

According to a preferred embodiment of the present invention, there is provided a time difference correction circuit for brightness and chrominance signals which divides a signal of tape detected through a head into a brightness signal and a chrominance signal respectively, frequency demodulates, high-passed filters and then adds them to produce a composite video signal comprising a delay line element for delaying a chrominance divided from a detected signal of a tape by a predetermined horizontal interval, a vertical synchronizing signal generation part for detecting a vertical synchronizing signal from said brightness signal and delaying it to a start point of a video signal, a switching means for switching said brightness and chrominance signals at the time of outputting a signal from said vertical synchronizing signal generation part, and a delay line element as a clock frequency.

The above and other related objects and features of the present invention will be apparent from the reading of following description of the disclosure found in the accompanying drawings and the novelty thereof pointed out in the claims.

BRIEF DESCRIPTION OF THE DRAWINGS

FIG. 3 through FIG. 8 are waveforms of output signal of respective circuit illustrating the operation of the invention.

DETAILED DESCRIPTION OF THE INVENTION

Now, the present invention will be described in more detail with reference to the accompanying drawings.

Figure 1:
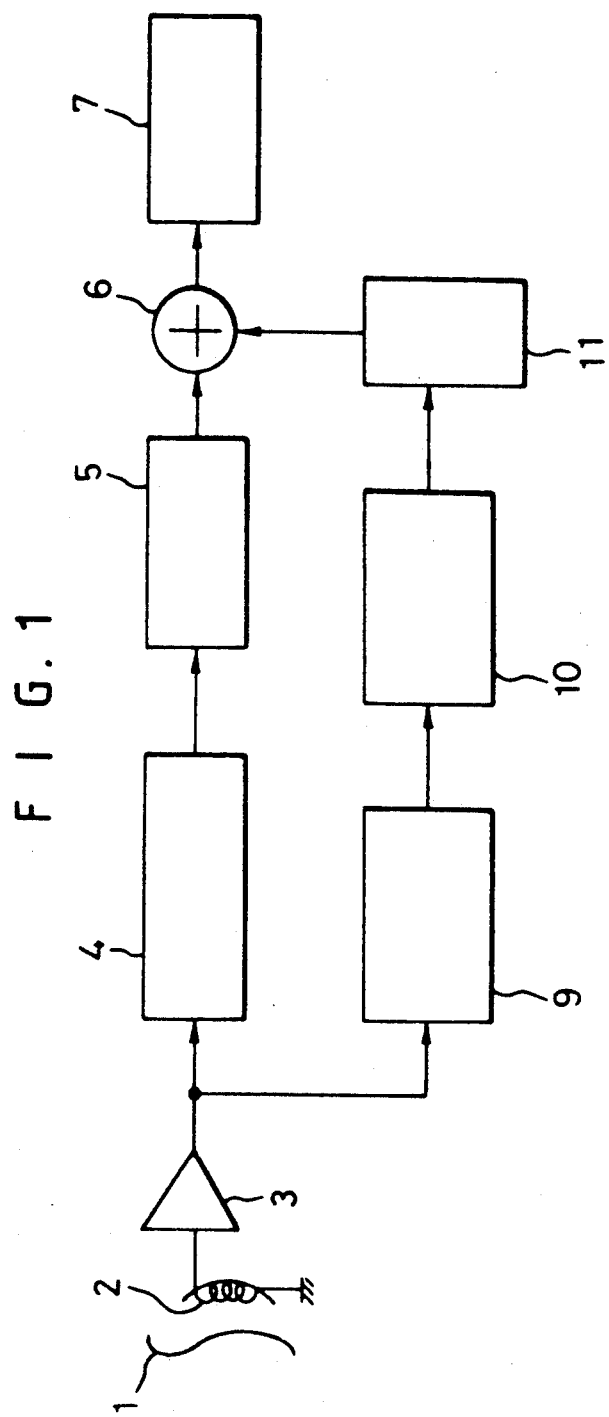
FIG. 1 is a block diagram of the conventional art.
Figure 2:
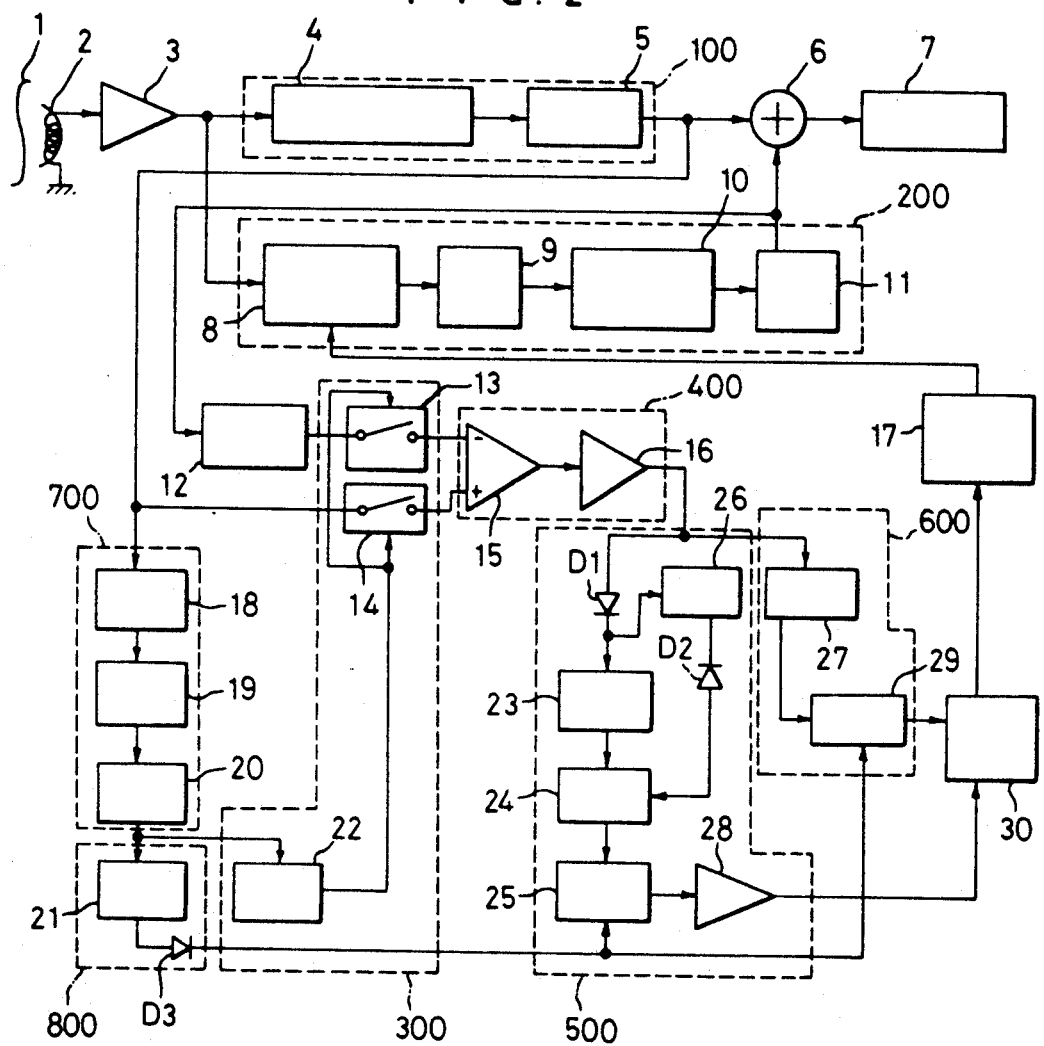
FIG. 2 is a block diagram of the invention.

FIG. 2 is a block diagram according to an embodiment of the present invention.

A time difference correction circuit for brightness and chrominance signals of the present invention comprises a head(2) for detecting a video signal from a tape(1), a comparison means for comparing brightness and chrominance signals applied through switching means and amplifying the difference between them by a predetermined amplification factor, a difference signal generation part between brightness and chrominance signals for sampling an output signal of said comparation part in form of a specific wave to generate a predetermined level corresponding to difference between them, amplifying it by a predetermined amplification factor and holding it to a start point of a next field, time difference signal detection part between brightness and chrominance signals for detecting whether a brightness signal goes in advance of a chrominance signal or not by using a output signal of said comparation part and holding a polarity signal corresponding to time difference between them to a start point of next field, an inverter for inverting a polarity of input signal applied from said difference signal generation part between brightness and chrominance signals by using a output signal of said time difference signal detection part between brightness and chrominance signals as a control signal, a reset part for differenciating an output signal of said vertical synchronizing signal generation part and outputting only plus component of the differenciated signal corresponding to 1 field interval to said difference signal generation part between brightness and chrominance signals as a control signal, and a voltage controlled oscillator for increasing and decreasing oscillating frequency by an amount corresponding to level and polarity of an output signal of said inverter and outputting said oscillating frequency to preamplifier(3) for amplifying the detected signal, a brightness signal detection part(100) consisting a frequency demodulator(4) for demodulating a frequency-modulated brightness signal and the first low pass filter for 3MHz(5), a chrominance signal detection part(200) consisting of a CCD(Charge Coupled Device) delay line element(8) for delaying an output signal of said preamplifier(3) for 1 horizontal interval, the second low pass filter(9) for filtering an output of said CCD delay line element(8), the main converter(10) for converting a low-pass filtered chrominance signal into a high-pass filtered chrominance to return its original frequency and the band pass filter(11) for filtering an output signal of said main converter(10), an adder(6) for adding an output signals of said first and second low pass filters to produce a composite video signal, an envelope detector(12) for detecting envelope of a chrominance signal from an output signal of said band pass filter(11), a switching means(300) consisting of the first and second switches(13) and (14) for switching an output of said envelope detector(12) and an output of said low pass filter(11), respectively, and a mono multivibrator(22) for outputting on/off control signal to said switches(13) and (14), a comparation part(400) consisting of comparator(15) for being compared with an output of said first and second switches(13) and (14) applied to an inverting terminal and a noniverting terminal, respectively and the amplifier(16) for amplifying an output of said comparator(15), a difference signal generation part between brightness and chrominance signals (500) consisting of a intergrator(23) and a differenciator(26) for intergrating and differenciating only plus component of the amplified signal of said comparation part(400) applied through a diode($D_1$), a sampler(24) for sampling only portion of the intergrated signal which is accorded with minus component of the differenciated signal, a holder(25) for holding an output signal of a sampler(24) before next filed interval in which reset signal is applied and a amplifier(28) for amplifying an output signal of a holder(25) by a predetermined amplification factor, a time difference signal detection part between brightness and chrominance signals(600) consisting of a differentiator(27) for differentiating an output signal of a comparation part(400) and a holder(29) for holding an output signal of a differentiator(27) before next field interval in which a reset signal is applied, an inverter(30) for inverting an output signal of said difference signal generation part between brightness and chrominance signals(500) according to an output signal of said time difference signal detection part between brightness and chrominance signals(600), a voltage controlled oscillator(17) for outputting voltage-controlled oscillating frequency to a CCD delay line element(8) as a clock signal according to an output signal of an inverter(30), a vertical synchronizing signal generation part(700) consisting of a synchronizing divider(18) for dividing a synchronizing signal from an output signal of said low pass filter(5), a vertical synchronizing divider(19) for dividing only a vertical synchronizing signal of a synchronizing signal and a delay part(20) for delaying the divided vertical synchronizing signal to a start point of the modulated video signal, and a reset part(800) consisting of a differentiator(21) for differentiating the delayed signal through a delay part(20) and a diode($D_3$) for passing only plus component of an output signal of said differentiator(21) to holders(25) and (29) as a reset signal.

The operation of the invention will now be described in detail with reference to FIG. 2 through FIG. 8.

In playback operation of VCR, first, the signal record in tape(1) such as a teletext signal or a video signal is detected by the head(2) as shown FIG. 3(A) and the detected signal is amplified by the preamplifier(3) by a predetermined amplification factor. The amplified signal is demodulated in the frequency demodulator(4) and filtered through the low pass filter for 3MHz(5) and then is applied to the adder(6) as a brightness signal as shown in FIG. 3(B).

On the other hand, the signal detected from the tape(1) is delayed through the CCD delay line element(8) of the chrominance signal detection part(200) by 1 horizontal interval(1H) and a high-band noise generated in the CCD delay line element(8) is removed through the low pass filter(9). Then the main converter(10) converts a low-pass filtered chrominance signal into a high-pass filtered chrominance signal to return its original frequency and an output signal of it is applied to the band pass filter(11).

And, the band pass filter(11) removes low and high frequency noises generated in the main converter(10) to produce a chrominance signal as shown in FIG. 3(C) which is applied to the adder(6) and the envelope detector(12) (see FIG. 3D).

Therefore, the adder(6) adds a brightness signal and a chrominance signal to produce a composite video signal(7) as shown in FIG. 3(E).

At this time, in the invention, an amount of a chrominance signal to be delayed through CCD delay line element(8) is increased or decreased by clock frequency applied from the voltage controlled oscillator(17) to remove the time difference between brightness and chrominance signals.

The principle of the operation to remove time difference between brightness and chrominance signals will be described as follows.

Thus, an output of the low pass filter for 3 MHz(5) is applied to the switch(13) of the switching means(300) and the synchronizing divider(18) of the vertical synchronizing signal generation part(700), respectively. At this time, the synchronizing divider(18) divides a synchronizing signal as shown in FIG. 3(F) from a brightness as shown in FIG. 3(B) and apply it to the vertical synchronizing divider(19). The vertical synchronizing divider(19) divides a vertical synchronizing signal as shown in FIG. 3(G) form a synchronizing signal as shown in FIG. 3(F) and apply it to the delay part(20).

And, the delay part(20) delays a vertical synchronizing signal by a start point of a video signal which is modulated 20T signal as shown in FIG. 3(H) and included in a vertical blanking interval.

Said delayed signal is applied to the differentiator(21) of the reset part(800) to be differentiated and the mono multivibrator(22) of the switching means(300). A differentiated signal as a reset signal is applied to the holder(25) of said the difference signal generation part between brightness and chrominance signal(500) and the holder(29) of said time difference signal detection part between brightness and chrominance signals(600) through the diode($D_3$), respectively. An output signal of the mono multivibrator(22) has a pulsewidth corresponding to 1H interval as shown in FIG. 3(I) and is applied to switches(13) and (14) as a control signal.

Therefore, when a control signal from the mono multivibrator(22) is applied to switches(13) and (14), a chrominance signal as shown in FIG. 3(D) through the envelope detector(12) and a brightness signal as shown in FIG. 3(B) are applied to the comparation part(400). Thus, only brightness signal and chrominance signal as shown in FIG. 3(B) and (C) corresponding to modulated 20T signal are applied to an inverting terminal and a noninverting terminal of the comparator(15) of the comparison part(400) through switches(13) and (14), respectively.

Then, the comparator(15) compares level of a brightness signal as shown in FIG. 3(B) with that of a chrominance signal as shown in FIG. 3(C) and outputs the signal corresponding to difference between them.

First, as shown in FIG. 4, when there is no time difference between brightness and chrominance signals as shown in FIG. 4(B) and (C) of a composite video signal as shown in FIG. 4(A), there is no output of the comparator(15) as shown in FIG. 4(D) so that an output of the amplifier (16) does not exist as shown in FIG. 4(E).

However, as shown in FIG. 5, when a brightness signal as shown in FIG. 5(A) goes in advance of a chrominance signal as shown in FIG. 5(B), the comparator(15) outputs a signal as shown in FIG. 5(C) so that the amplifier(16) outputs a rectangular wave signal as shown in FIG. 5(D).

On the other hand, as shown in FIG. 6, when a chrominance signal as shown in FIG. 6(B) goes in advance of a brightness signal as shown in FIG. 6(A), the comparator(15) outputs a signal as shown in FIG. 6(C) so that the amplifier(16) outputs a rectangular wave signal as shown in FIG. 6(D).

Therefore, an output signal of the comparator(15) is amplified through the amplifier(16) so that the rectangular wave signal is applied to the integrator(23) of the difference signal generation part between brightness and chrominance signals(500) and the differentiator(27) of the time difference signal detection part between brightness and chrominance signals(600).

Only the positive component of said signal is passed through the diode($D_1$) as shown in FIG. 3(J) and is integrated in the intergator(23) as shown in FIG. 3(K) and then the integrated signal is applied to the sampler (24). At the same time, the positive component of the rectanglar wave signal is differentiated in the differentiator(26) as shown in FIG. 3(L) and only the negative component FIG. 3(M) of the differentiated signal is passed through the diode($D_2$) and is applied to the sampler(24).

Therefore, the sampler(24) samples only the portion of the integrated signal which is accorded with the differentiated signal.

The sampled signal is applied to the holder(25) to hold the level of it for 1 field (that is, to a start point of next field) and output of the holder(25) is amplified by the amplifier(28) by a predetermined amplification factor and then the amplified signal is applied to the inveter(30).

On the other hand, the differentiator(27) of the time difference detection part between brightness and chrominance signals(600) differentiates the rectangular wave as shown in FIG. 5(D) and FIG. 6(D) applied from the amplifier(16) and the holder(29) holds the differentiated signal before the reset signal is applied from said reset part(800).

That is, when a brightness signal goes in advance of a chrominance signal, as shown in FIG. 7(A), the differentiator(27) of the time difference signal detection part between brightness and chrominance signals (600) differentiates an output signal of the comparation part(400) as shown in FIG. 7(B). Whereas a chrominance signal goes in advance of a brightness signal, as shown in FIG. 7(C), it differentiates an output signal of the comparison part(400) as shown in FIG. 7(D). The holder (29) holds an output of said differentiator as shown in FIG. 7(B) or (D) for 1 field interval, that is, before the reset signal is applied.

As this time, when the vertical sychronizing signal generation part (700) outputs a pulse as shown in FIG. 8(A) corresponding to a vertical synchronizing signal to the reset part(800), the differentiator(21) differentiates the pulse as shown in FIG. 8(B) and the negative component of the differentiated signal is removed through the diode($D_3$) so that only the positive component of it is outputted as shown in FIG. 8(C).

The positive component is then of it is applied to holders(25) and (29) as a reset signal at the time of the end point of 1 field interval.

An output of the holder(29) is applied to the inverter(30) as a control signal so that when the positive component of the differentiated signal is applied thereto, it does not operate, but when the negative component is applied thereto, it inverts input data inputted from the difference signal generation part between brightness and chrominance signals(500).

An output signal of the inverter(30) is applied to the voltage controlled oscillator(17) as a control signal so that when there is no input signal, it oscillates normally whereas when there is input signal, it increases or decreases oscillating frequency by an amount corresponding to level and polarity of input data and outputs it to CCD delay line element(8) as a clock frequency.

The CCD delay line element(8) delays an output of the amplifier(3) to shift the sampling data stored in respective cell before and after.

That is, when oscillating frequency goes fast, it decreases the 1H delayed state and when it goes slow, it delays more than 1H delayed state. Accordingly, a 1H delayed amount is increased or decreased so that the difference between brightness and chrominance signals in corrected.

As stated above, in the present invention, picture image in which brightness and chrominance signals are accorded each other regardless of a tape or signal processing of VCR is obtained so that picture is more clear and when recorded several times, time difference between brightness and chrominance signals is corrected so that degradation of picture quality is prevented.

While the present invention has been particularly shown and described with reference to preferred embodiments thereof, it should be understood that various modifications, variations and other changes may be made by those skilled in the art without departing from the spirit of the invention.

The scope of the invention is therefore to be determined solely by the appended claims.

What is claimed is:

1. A time difference correction circuit for brightness and chrominance signals which divides a signal from a tape detected through a head into a brightness signal and a chrominance signal, said circuit comprising:

delay means for delaying the chrominance signal by a predetermined horizontal interval;

a vertical synchronizing signal generation means for detecting a vertical synchronizing signal from said brightness signal and delaying it to a start point of a video signal;

a switching means for switching said brightness and chrominance signals at the start point of the video signal;

a comparison means for comparing the brightness and chrominance signals applied through said switching means and for amplifying a difference between them by a predetermined amplification factor;

a difference signal generation means for sampling an output signal of said comparison means in the form of a specific wave to generate a predetermined level corresponding to a difference between the brightness and chrominance signals, amplifying the difference by a predetermined amplification factor and holding it to a start point of a next field;

a time difference signal detection means for detecting a time difference between the brightness and chrominance signals using the output of said comparison means and holding a polarity signal corresponding to the time difference to the start point of the next field;

an invertor means for inverting polarity of the output of said difference signal generation means by using the polarity signal of said time difference signal detection means as a control signal;

a reset means for differentiating an output signal of said vertical synchronizing signal generation means and outputting only a positive component of the differentiated signal corresponding to a single field interval to said difference signal generation means as a control signal; and a voltage controlled oscillator for increasing and decreasing oscillating frequency by an amount corresponding to level and polarity of an output signal of said invertor means and outputting said oscillating frequency to said delay means as a clock frequency.

2. A time difference correction circuit for brightness and chrominance signals as claimed in claim 1, wherein the vertical synchronizing signal generation means comprises a synchronizing divider for dividing a synchronizing signal from the signal from the tape, a vertical synchronizing divider for dividing a vertical synchronizing signal of the synchronizing signal, and a delay means for delaying a divided vertical synchronizing signal to a start point of a modulated video signal.

3. A time difference correction circuit for brightness and chorminance signals as claimed in claim 1, wherein the switching means comprises a mono multivibrator for generating a pulse having a predetermined pulsewidth corresponding to a modulated video signal at the start point of the video signal and first and second switches for switching said brightness signal and chrominance signal using an output of said mono multivibrator as a control.

4. A time difference correction circuit for brightness and chrominance signals as claimed in claim 1, wherein the difference signal generation means comprises a first diode for passing only a positive component of an output signal of said comparison means, integration and differentiation means for inegrating and differentiating an output signal of said first diode, a second diode for passing only the negative component of a differentiated output signal of said integration and differentiation means, a sampler for sampling a portion of an integrated output signal of said integration and differentiation means in accordance with the negative component of the differntiated signal, and a holder for holding an output signal of the sampler to the start point of the next field.

5. A time difference correction circuit for brightness and chrominance signals as claimed in claim 1, wherein the time difference signal detection means comprises a differentiation means for differentiating an output signal of said comparison means and a holder for holding an output signal of said differentiation means to the start point of the next field.

6. A time difference correction circuit for brightness and chrominance signals as claimed in claim 1, wherein the reset means comprises a differentiation means for differentiating an output signal of said vertical synchronizing signal generation means and a diode for passing only a positive componet of an output of said differentiation means corresponding to a single field interval.

* * * * *